(12) United States Patent
Orth

(10) Patent No.: US 8,706,448 B2
(45) Date of Patent: Apr. 22, 2014

(54) WIRELESS FIELD DEVICE WITH REMOVABLE POWER SOURCE

(75) Inventor: Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 281 days.

(21) Appl. No.: 13/177,822

(22) Filed: Jul. 7, 2011

(65) Prior Publication Data

US 2013/0009472 A1    Jan. 10, 2013

(51) Int. Cl.
*H02J 1/00* (2006.01)

(52) U.S. Cl.
USPC .............................. 702/188; 307/43

(58) Field of Classification Search
USPC ........................... 702/188; 307/43
See application file for complete search history.

(56) References Cited

U.S. PATENT DOCUMENTS

| | | | |
|---|---|---|---|
| 7,812,480 B2 | 10/2010 | Datta et al. | 307/66 |
| 2006/0148410 A1 | 7/2006 | Nelson et al. | |
| 2006/0244315 A1 | 11/2006 | Kogan et al. | 307/150 |
| 2007/0010968 A1* | 1/2007 | Longsdorf et al. | 702/183 |
| 2007/0161352 A1* | 7/2007 | Dobrowski et al. | 455/69 |
| 2007/0201192 A1 | 8/2007 | McGuire et al. | 361/600 |
| 2008/0186656 A1 | 8/2008 | Striano | 361/625 |
| 2008/0274772 A1 | 11/2008 | Nelson et al. | 455/572 |
| 2008/0280568 A1* | 11/2008 | Kielb et al. | 455/74.1 |
| 2009/0230778 A1* | 9/2009 | Alfven et al. | 307/116 |
| 2009/0236912 A1* | 9/2009 | Datta et al. | 307/66 |
| 2009/0260438 A1 | 10/2009 | Hedtke | |

FOREIGN PATENT DOCUMENTS

JP     2008079438 A    4/2008
WO    WO 2004/098014  11/2004

OTHER PUBLICATIONS

International Search Report and Written Opinion for PCT Application No. PCT/US2011/063891, dated Mar. 21, 2012, 11 pages.
International Search Report from PCT Application No. PCT/US2012/044168, dated Oct. 2, 2012, 4 pgs.
Written Opinion from PCT Application No. PCT/US2012/044168, dated Oct. 2, 2012, 7 pgs.

* cited by examiner

*Primary Examiner* — John Breene
*Assistant Examiner* — Haihui Zhang
(74) *Attorney, Agent, or Firm* — Westman, Champlin & Koehler, P.A.

(57) ABSTRACT

A wireless field device for use in controlling or monitoring an industrial process, includes a process interface configured to couple to a process fluid. Field device circuitry is coupled to the process interface and configured to measure or control a process variable. Wireless communication circuitry is configured to provide wireless communication. At least one electrical access terminal is configured to provide an electrical connection to circuitry of the field device. A power supply is configured to power the wireless field device. The power supply includes a removable primary power source to provide power to the field device for extended periods of time. A secondary power source is configured to provide power to the field device when the primary power source is removed.

20 Claims, 2 Drawing Sheets

WIRELESS FIELD DEVICE WITH REMOVABLE POWER SOURCE

BACKGROUND OF THE INVENTION

The present invention relates to field devices of the type used in industrial processes. More specifically, the present invention relates to a field device for use in monitoring or controlling an industrial process having a removable power source.

Field devices are used in industrial processes to control or monitor operation of the process. Wireless field devices can measure any of a number of process characteristics such as, for example, pressure, level, flow velocity, mass flow, pH, temperature, density, and conductivity or can monitor process equipment for such things as vibration, strain or corrosion or can monitor the general plant environment for such things as fire and gas detection or can be used for locating the present position of workers and equipment. For example, a process variable transmitter is a type of field device which can be used to monitor a process variable of a process fluid. Examples process variables include temperature, pressure, level, flow rate, etc. A controller is a type of field device which is used to control operation of the process. For example, the controller can control a flow rate of a process fluid by adjusting a position of a valve in a pipe carrying the fluid.

Traditionally, field devices have been connected to a central control room through electrical wiring. One type of connection uses two electrical wires and is known as a two wire process signal loop. In such a configuration, the same two wires are used for communication and to power the field device. More recently, wireless communication techniques have been developed. In such a configuration, wires are not required to connect the field device to another location. One example protocol is the wireless IEC 62591 International Standard (Wireless HART®).

Some types of wireless field devices include an internal power source such that they are capable of operating without any external electrical connections. Such field devices include a power source such as a battery which is used to power the field device. Energy harvesting techniques, such as solar power supply, thermal electric generator, vibration harvester, etc., can be used to provide additional power to the device. One example of a field device which includes multiple power sources is shown in U.S. Pat. No. 7,812,480 entitled APPARATUS AND METHOD FOR ON-LINE POWER SOURCE REPLACEMENT IN WIRELESS TRANSMITTERS AND OTHER DEVICE filed Mar. 19, 2008 by Datta et al.

SUMMARY

A wireless field device for use in controlling or monitoring an industrial process, includes a process interface configured to couple to a process fluid. Wireless field devices can measure any of a number of process characteristics such as, for example, pressure, level, flow velocity, mass flow, pH, temperature, density, and conductivity or can monitor process equipment for such things as vibration, strain or corrosion or can monitor the general plant environment for such things as fire and gas detection or can be used for locating the present position of workers and equipment. Field device circuitry is coupled to the process interface and configured to measure or control a process variable, which may include a physical attribute of an item that is not a part of an ongoing process. Wireless communication circuitry is configured to provide wireless communication. An electrical access terminal is configured to provide an electrical connection to circuitry of the field device. A power supply is configured to power the wireless field device. The power supply includes a removable primary power source to provide power to the field device for extended periods of time. A secondary power source is configured to provide power to the field device when the primary power source is removed.

DETAILED DESCRIPTION

The present invention provides a field device having a removable power source. The removable power source is configured to provide power to the field device for extended periods of time. Removal of the removable power source provides access to at least one electrical access terminals which can be used to electrically couple to circuitry of the field device. A backup or secondary power source is provided to power the field device when the removable power source has been removed. Other aspects of the invention include the detection of removal of the removable power source. Information can be transmitted to another location in response to the removal of the removable power source. Similarly, upon detection of the removal of the removable power source, the field device can enter a low or reduced power mode. The device can also be configured to receive a sleep command in which the entire device is put into a low power sleep mode. This sleep mode can occur despite power availability from the removable power source and/or the backup power source. This can be useful when the device is decommissioned or otherwise taken out of service.

Figure 1:
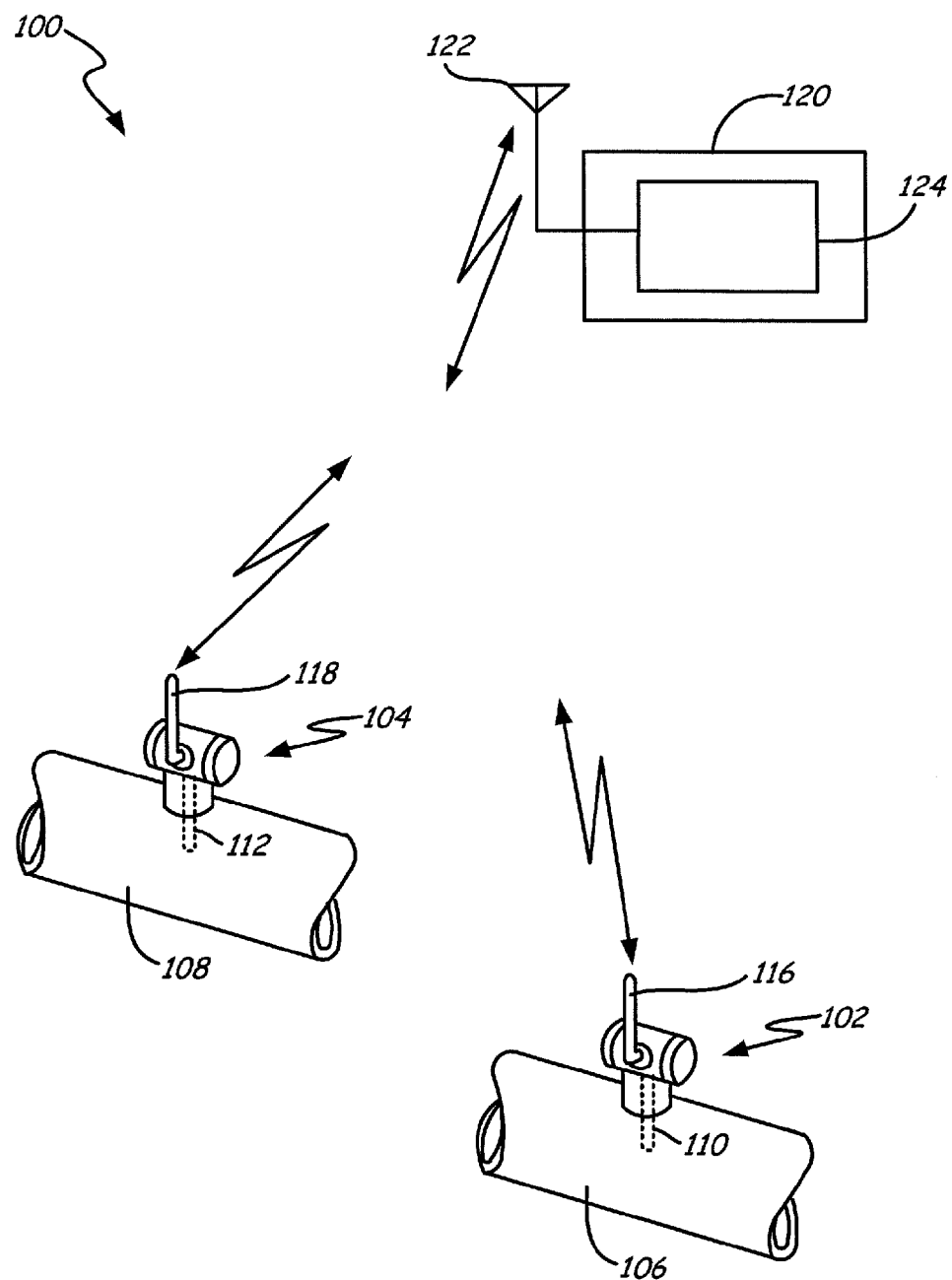
FIG. 1 is a simplified diagram of an industrial process control system including wireless field devices.

FIG. 1 is a simplified diagram showing an industrial process 100 including field devices 102 and 104. Field devices 102 and 104 are illustrated as being coupled to process piping 106 and 108, respectively. Field devices 102 and 104 include processing interface elements 110 and 112, respectively. These process interface elements can comprise a sensor that is used to sense a process variable of a process fluid. Example process variables include temperature, pressure, flow, pH, etc. Similarly, the process interface elements 110, 112 can comprise control elements which are used to control a process variable. Example control elements include a valve, a heating element, a pump, etc. Wireless field devices can measure any of a number of process characteristics such as, for example, pressure, level, flow velocity, mass flow, pH, temperature, density, and conductivity or can monitor process equipment for such things as vibration, strain or corrosion or can monitor the general plant environment for such things as fire and gas detection or can be used for locating the present position of workers and equipment. Field devices 102 and 104 are configured for wireless communication over wireless network 117 and include antennas 116 and 118, respectively. Through this wireless communication, the field devices 116, 118 can communicate with each other, or can communicate with a gateway (121) at remote locations such as process control room 120 which is illustrated as including host computer 124 coupled to gateway 121. This wireless communication can be in accordance with any wireless communication techniques, for example, the wireless IEC 62591 communication standard protocol.

As discussed below in more detail, field devices 102 and 104 include power supplies having a removable primary power source. Removing the primary power source can, for example, provide access to at least one electrical access terminals which can be used to access electrical circuitry within the field device 102 or 104. When the primary power source is removed, it can be replaced with a replacement primary power source. While the primary power source is removed, power to the field device can be maintained using a secondary power source.

Figure 2:
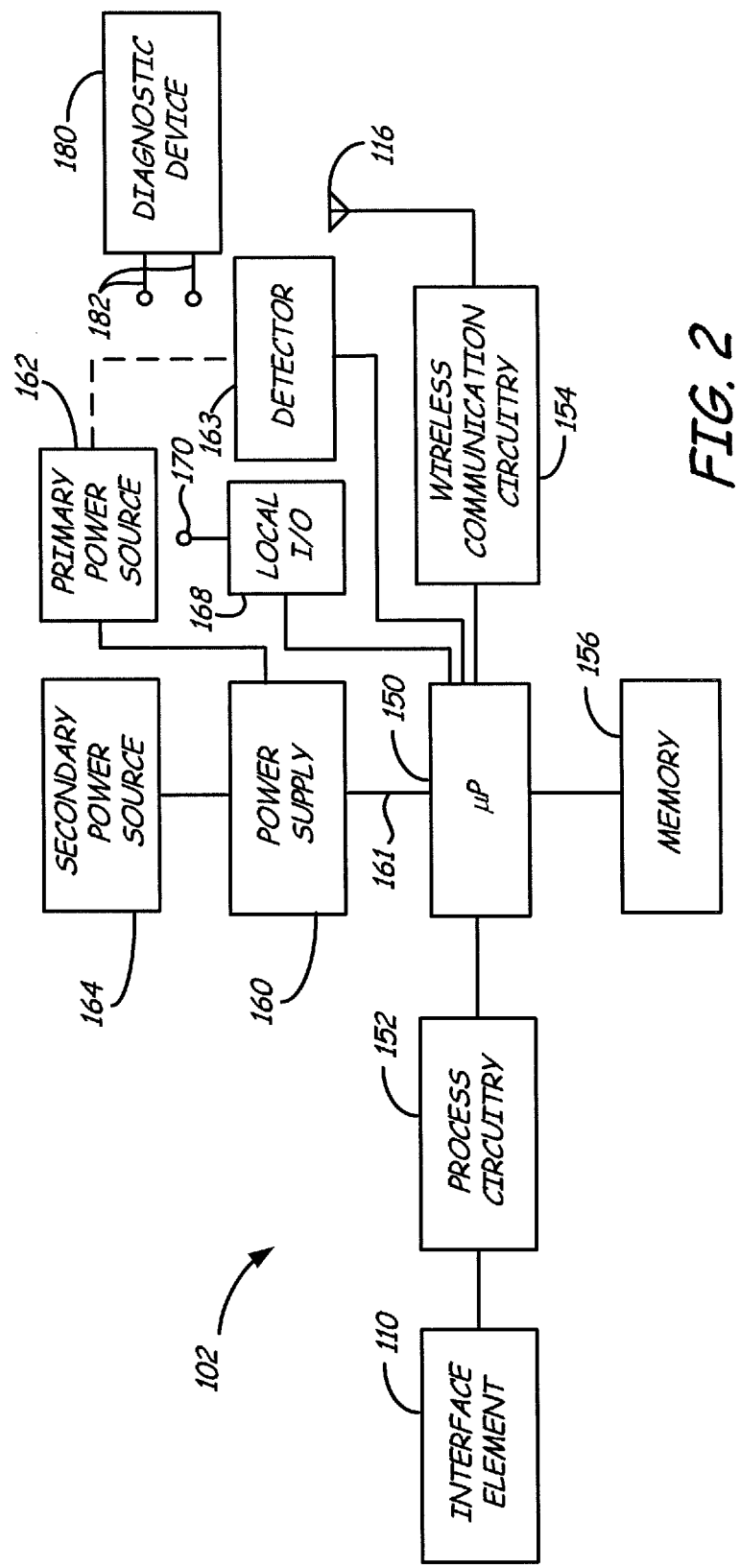
FIG. 2 is a simplified block diagram of the field device of FIG. 1.

FIG. 2 is a simplified block diagram of field device 102. Field device 102 includes a microprocessor 150 which couples to process circuitry 152 to the process interface element 110. The microprocessor is configured to communicate using wireless communication circuitry 154 which couples to antenna 116. Microprocessor 150 operates in accordance with instructions stored in memory 156. The memory 156 can also be used to store information, for example, for future retrieval. A power management circuit 160 is used to condition power to circuitry within field device 102. An optional communication connection can also be provided between the power management circuit 160 and microprocessor 150. The power management circuit 160 provides stable power to the circuitry using power from a primary power source 162. A secondary power source 164 also couples to the power management circuit 160 and can be used to provide power when the primary power source (or removable power source) 162 is removed. As illustrated in FIG. 2, a local input/output port 168 is provided and coupled to the microprocessor 150. At least one access terminal 170 is used to couple to the local I/O port 168 using for example, a hand held communicator or other test equipment. Additionally, the at least one access terminal 170 may be used to couple to a process variable sensor for process control element, or other circuitry.

Typically, in prior wireless field devices, a primary power source was used which cannot be recharged and must be replaced when it is completely drained of useful energy. When the primary power source is removed, the field device temporarily loses power and must be shut down. This can be detrimental in that the device is no longer functioning and is therefore unable to transmit any information to a host system, such as a Distributed Control System, Data Log System or Asset Management System. Information stored in volatile memory may also be lost. Further, if the wireless field device is part of a multi-hop network wireless communication architecture, the loss of the field device may degrade operation of the network and may cause other devices, considered as descendants of the device, to fall off the network. Upon the replacement of the primary power source, the field device is powered up and must rejoin the network. This rejoining takes a period of time and the device is not fully functional until this process is completed. Descendants may have no path to pass their readings through the network during this time. Further, in some wireless field devices, the electrical access terminals are covered or otherwise obstructed by the primary power source. In order to gain access to the at least one access terminal 170, the primary power source 162 must be removed causing the device to power down as described above.

The present invention addresses these shortcomings by including a secondary power source 164 to provide power to power management circuit 160 when a primary power source 162 is disconnected and/or removed from the field device 102. The secondary power source 164 can comprise a rechargeable battery, a high capacity capacitor, for example a "super cap" or "ultra cap", or a combination of one or more capacitors and supercaps. The energy storage capacity of the secondary power source 164 may be relatively small, for example, only sufficient power to provide power to the field device 102 from a few minutes to an hour while the primary power source 162 is replaced. Once the primary power source is replaced, the secondary power source 164 can be recharged using power from the primary power source 162.

Secondary power source 164 can be in accordance with any appropriate technology. Although large capacity capacitors can be used to store power, they do have lifetime limitations as well as temperature limitations. Certain types of rechargeable batteries may also be used, but they may too have drawbacks. For example, lithium ion batteries have a limited lifetime and they are also temperature sensitive. Further, recharging lithium ion batteries may be difficult. A rechargeable solid state Lithium Phosphorus Oxynitride (Li—PON) battery may be used such as the Thinergy battery available from Infinite Power Solutions, Inc. (IPF) of Littleton, Colo. (www.infinitepowersolutions.com). Such a battery may be integrated into a circuit board which contains circuitry of the field device such as the wireless communication circuitry 154, power management circuit circuitry 160, circuitry related to microprocessor 150, etc. such batteries may have a rating of from 0.2 mA-hours to 2.5 mA-hours depending upon their size and configuration.

In one configuration, the at least one access terminal 170 comprises two electrical connections for use with a two wire process signal loop. In such a configuration, a current level is used to represent a process variable. In some configurations digital information can also be modulated onto the same two wires. One example is the HART® communication standard. These communication terminals can be used to couple a diagnostic device to the field device 102. An example diagnostic device 180 is illustrated in FIG. 2. The diagnostic device 180 includes a two wire process signal loop connection 182 for coupling to the at least one access terminal 170. In some configurations, the field device 102 can be powered with power carried on the two wire process signal loop coupled to two electrical connections of the at least one access terminal 170. The diagnostic device 180 can be configured to provide configuration commands to circuitry of the field device 102 through the at least one electrical access terminal 170. Similarly, the field device 102 can communicate information to the diagnostic device 180 through the at least one electrical access terminal 170. Such information can include diagnostic information, information related to sensed process variables, etc.

In order to couple the diagnostic device 180 to the at least one access terminal 170, the primary power source 162 can be removed to provide better access. When this power source is removed, supplemental power is provided by secondary power source 164 such that the field device does not power down or otherwise reset.

In another example configuration, the at least one access terminal 170 is used to couple to a process interface element. In such a configuration, element 180 comprises a process interface element. For example, element 180 can comprise a process variable sensor such as a temperature sensor. Electrical connections to the temperature sensor are provided to the at least one access terminal 170. In order to provide this connection, an operator must remove the primary power source 162 while the connection is made. The connectors may comprise terminals which use a screw or other connection technique to secure the wiring to the temperature sensor. Connecting the wires using these connectors may take a number of minutes during which the field device is powered using secondary power source 164.

When the primary power source 162 is removed, the power management circuit 160 can provide a signal to the microprocessor 150 to control operation of circuitry within the field device 102. For example, using a data connection to the microprocessor 150 can be used to cause the circuitry in the device to enter a reduced power or "sleep" mode. This configuration can be used to extend the period during which the secondary power source 164 is capable of powering circuitry of field device 102. Detection of the removal of the primary power source 162 may be through the use of, for example, a detector 163 such as a voltage sensor configured to sense the voltage of the primary power source 162. In one configuration, information related to the disconnection of the primary power source 162 can be communicated over the wireless communication network number 117 using wireless communication circuitry 154. This information can be monitored at a remote location. When in low power mode, communication traffic flowing through the field device 102 in a mesh network configuration can be routed to other field devices in order to reduce the power consumption by the field device 102.

When the primary power source 162 is removed, other techniques to reduce power consumption may also be employed. For example, the update times of a sensed process variable maybe reduced, the operating frequency of the microprocessor 150 may be reduced, the amount of data transmitted by wireless communication circuitry 154 may be reduced, certain circuitry within the field device 102 may be placed in a low power mode or even turned off, etc. Another technique to reduce power consumption is to monitor changes in a sensed process variable and only transmit an update if a rate of charge of the process variable is greater than a predetermined threshold or if the process variable has changed more than a set amount.

In another example configuration, the field device 102 is configured to receive a power off command which instructs it to turn off at circuitry even though power remains in the power sources 162, 164. This allows the device to be decommissioned or otherwise powered down without having to remove either of the power sources 162, 164. This command can be received through the wireless communication circuitry 154, the local I/O 168, etc. The input can comprise, for example, a manual input such as a button which is located internally or externally to the device, etc.

In another example configuration, the primary power source 162 comprises an energy harvesting device such as a solar cell, thermal electric generator element, vibration harvester, etc. In such a configuration, the secondary power source 164 can provide power to the field device 102 when the primary power source 162 is not sufficient generating power. For example, this can be during periods of no sun, no heat, no vibration, etc. In some configuration, the field device 102 enters a low power mode in which circuitry in the device 102 periodically checks for incoming communications. When the process is started or is it desired that the field device 102 enter in to a normal operating mode, a command can be sent to the field device 102 to instruct the device 102 to leave the low power mode and begin normal operations. For example, if the primary power source 162 generates electricity using heat as a source of power then, when the process is shut down no heat will be available to generate electricity and device 102 can enter a low power mode and use power from secondary power source 164. In such a configuration, prior to restarting the process, a command can be sent to field device 102 to instruct the field device 102 to begin normal operation even though there is insufficient heat available to power the device 102. Once the device 102 is operating normally, the process can be restarted. As the process operates and begins to generate heat, the primary power source 162 can be used to provide the power to the field device 102.

Although the present invention has been described with reference to preferred embodiments, workers skilled in the art will recognize that changes may be made in form and detail without departing from the spirit and scope of the invention. The at least one electrical access terminal is not the same as the connectors used to couple to the primary power source. As used herein, process variable includes any characteristic of a substance and the term process includes natural and industrial processes.

What is claimed is:

1. A wireless field device for use in controlling or monitoring an industrial process, industrial process equipment or industrial process plant comprising:
   a process interface configured to control or sense a process variable of a process fluid of the industrial process;
   field device circuitry coupled to the process interface configured to measure or control the process variable;
   a power supply configured to power the wireless field device, comprising:
      a removable primary power source;
      a secondary power source configured to provide power to the field device when the primary power source is removed;
      a detector configured to detect removal of the primary power source or insufficient power of the primary power source; and
   wireless communication circuitry configured to provide wireless communication and communicate at a reduced data rate upon detection of removal or insufficient power of the primary power source.

2. The wireless field device of claim 1, wherein circuitry of the field device is configured to enter a low power mode upon detection of removal of the primary power source or insufficient power of the primary power source.

3. The wireless field device of claim 1, wherein at least one electrical access terminal configured to provide an electrical connection to circuitry of the field device and wherein the electrical access terminal is at least partially covered by the removable power source.

4. The wireless field device of claim 3, wherein the at least one electrical access terminal comprises two connections for coupling to a two wire process signal loop.

5. The wireless field device of claim 3, wherein the at least one access terminal is configured to couple to a diagnostic device.

6. The wireless field device of claim 5, wherein the diagnostic device provides configuration commands to the wireless field device through the at least one electrical access terminal.

7. The wireless field device of claim 5, wherein the diagnostic device is configured to receive information related to a sensed process variable through the at least one electrical access terminal.

8. The wireless field device of claim 3, including a process variable sensor coupled to circuitry of the wireless field device through the at least one electrical access terminal.

9. The wireless field device of claim 1, wherein the primary power source comprises a battery.

10. The wireless field device of claim 1, wherein the secondary power source comprises a battery.

11. The wireless field device of claim 1, wherein the secondary power source comprises a capacitor or a supercapacitor or a combination of the two.

12. The wireless field device of claim 1, wherein the wireless communication circuitry is configured to transmit information related to removal of the primary power source or insufficient power of the primary power source.

13. The wireless field device of claim 1, including circuitry configured to enter a sleep state in response to a power off command.

14. The wireless field device of claim 1, wherein the secondary power source is charged by the primary power source.

15. A method of powering a wireless field device for use in controlling or monitoring an industrial process, comprising:
provide a process interface configured to couple to a process fluid of the industrial process;
measuring or controlling a process variable using the process interface;
wirelessly communicating with the wireless field device using wireless communication circuitry;
powering circuitry of the wireless field device using a primary power source;
removing the primary power source from the field device;
powering the field device with a secondary power source when the primary power source is removed;
detecting removal of the primary power source; and
wirelessly communicating with the wireless communication circuitry at a reduced rate upon detection of removal of the primary power source.

16. The method of claim 15, including entering a low power mode upon detection of removal of the primary power source or insufficient power of the primary power source.

17. The method of claim 15, including coupling to a two wire process signal loop with the at least one electrical access terminal.

18. The method of claim 15, including coupling to couple to a diagnostic device with the at least one access terminal.

19. The method of claim 15, including coupling to a process variable sensor with the at least one electrical access terminal.

20. The method of claim 15, including transmitting information related to removal of the primary power source or insufficient power of the primary power source.

* * * * *